(12) United States Patent
Stiner

(10) Patent No.: US 6,591,222 B2
(45) Date of Patent: Jul. 8, 2003

(54) REEL MECHANISM WITH LINE TENSION/FISH WEIGHT INDICATOR

(75) Inventor: Roy E. Stiner, Owasso, OK (US)

(73) Assignee: W.C. Bradley/Zebco Holdings, Inc., Tulsa, OK (US)

( * ) Notice: Subject to any disclaimer, the term of this patent is extended or adjusted under 35 U.S.C. 154(b) by 55 days.

(21) Appl. No.: 09/843,525

(22) Filed: Apr. 27, 2001

(65) Prior Publication Data

US 2002/0161549 A1 Oct. 31, 2002

(51) Int. Cl.7 ............................................ G01G 11/00
(52) U.S. Cl. ........................................ 702/173; 702/41
(58) Field of Search .................... 43/4, 17; 73/862.39, 73/862.44; 177/245; 242/84.1 K, 84.5 A, 84.54, 217, 223, 289; 463/37; 702/173, 41; A01K 89/015, 91/06; G01B 21/06

(56) References Cited

U.S. PATENT DOCUMENTS

| | | | |
|---|---|---|---|
| 3,246,859 A | 4/1966 | Martin | |
| 4,422,258 A | 12/1983 | Adams et al. | |
| 4,516,348 A | 5/1985 | Hirose | |
| 4,552,318 A | 11/1985 | Durham | |
| 4,650,161 A | 3/1987 | Kaneko | |
| 4,693,125 A * | 9/1987 | Krutz et al. | ............. 73/862.39 |
| 4,840,327 A | 6/1989 | Kaneko | |
| 5,219,131 A | 6/1993 | Furomoto | |
| 5,243,147 A | 9/1993 | Johnson | |
| 5,321,903 A | 6/1994 | Ebener | |
| 5,479,831 A | 1/1996 | Hirose | |
| 5,560,560 A | 10/1996 | Hirose | |
| 5,639,038 A | 6/1997 | Hirose | |
| 5,782,033 A * | 7/1998 | Park et al. | ........................ 43/4 |
| 5,833,156 A | 11/1998 | Park et al. | |
| 5,894,691 A | 4/1999 | Zepeda, Sr. | |
| 6,126,103 A * | 10/2000 | Nanbu | ......................... 242/223 |
| 6,312,335 B1 * | 11/2001 | Tosaki et al. | ................. 463/37 |

FOREIGN PATENT DOCUMENTS

| | | | | |
|---|---|---|---|---|
| DE | 3644165 A1 * | 7/1988 | ......... | A01K/91/06 |
| JP | 05030883 A * | 2/1993 | ......... | A01K/89/015 |
| JP | 05161438 A * | 6/1993 | .......... | G01B/21/06 |
| JP | 05184271 A * | 7/1993 | ......... | A01K/89/015 |

* cited by examiner

*Primary Examiner*—John Barlow
*Assistant Examiner*—Douglas Washburn
(74) *Attorney, Agent, or Firm*—Fellers, Snider, Blankenship, Bailey & Tippens, P.C.

(57) ABSTRACT

A fishing reel which displays an estimated weight of a fish caught on a hook attached to fishing line attached to the fishing reel while the fish is reeled-in that includes a line spool; a load cell for measuring an outward force pulling on the line; a processor in communication with the output of the load cell such that the processor can periodically read the outward force on the line; and a display for displaying an estimated weight of the fish to a fisherman. The processor calculates an estimated weight and updates the display which displays the estimated weight, based on forces measured between the time a fish strikes the hook and the landing of the fish.

12 Claims, 5 Drawing Sheets

REEL MECHANISM WITH LINE TENSION/FISH WEIGHT INDICATOR

BACKGROUND OF THE INVENTION

1. Field of the Invention

This invention relates generally to a fishing reel. More particularly, but not by way of limitation, the present invention relates to a fishing reel wherein is incorporated an apparatus for sensing the tension on the fishing line and a display device to show a measurement indicative of the tension or a derivative of such measurement, an example of which is the weight of a fish on the line.

2. Background

Fishing reels for sport fishing are known in the art and are available in a variety of styles such as bait casting reels, spin casting reels, spinning reels, fly fishing reels, etc. Such reels are available with a wide variety of features which enhance the fishing experience. For example, most reels provide an adjustable drag mechanism whereby a fisherman may set a force level so that the reel will resist forces below the drag force but will allow line to payout when forces are encountered which exceed the drag force. This prevents a large fish from breaking the fishing line or damaging the reel.

Generally speaking, it would be desirable for a fisherman to know the amount of tension on the line so that the drag setting might be adjusted. If known, it would also be possible to calculate the weight of a fish, both while reeling the fish in and after the fish is out of the water. Such a feature is desirable for a number of practical considerations as well as satisfying the curiosity of the fisherman. For example, if the force at which the fish is pulling on the line exceeds the tensile strength of the fishing line, the fisherman would be able to lighten the drag rather than risk a broken line. In addition, knowing the approximate size of the fish while reeling the fish in would increase the excitement of landing the fish.

Fish scales have long been available for weighing a fish after it is out of the water. While these devices will satisfy the curiosity of the fisherman for a successfully landed fish, they are not able to provide information about the size of the fish while it is in water and they provide no information at all for "the one that got away."

While there are a number of prior art devices for measuring the line tension on a fishing reel, none of these provide an estimate of the weight of the fish. For example, U.S. Pat. No. 4,422,258 issued to Adams, et al. discloses an accessory which may be attached to a fishing rod (or alternatively incorporated into a fishing reel) to provide an indication of the tension on the fishing line. Unfortunately, the construction of the '258 device requires more space than is typically available in a modern fishing reel, the display provided thereon is mechanical in nature and provides very limited resolution, and the device's ability to indicate large forces of short duration, i.e., peak tension, is limited. The '258 device also requires the fishing line to make physical contact with multiple elements to create a nonlinear path as required for operation of the device. This contact creates a resistance to movement of the fishing line thereby hampering casting.

Another method for measuring line tension is disclosed in U.S. Pat. No. 5,639,038 issued to Hirose. This device employs a coil opposed to thin magnetostrictive bands bonded to the spool shaft to determine the torque applied to the spool shaft. In order to translate torque into line tension, the height of the line wound onto the spool must be determined with, for example, an ultrasonic measuring device. While this device may actually produce a quantifiable measurement, the circuitry involved is relatively complex, e.g., the torque sensor requires a relatively high frequency excitation voltage. In addition, the measurement device places constraints on other, seemingly unrelated, reel components. For example, the use of ferrous metals near the torque sensor may adversely impact the measurements taken by such a device. Hence, stainless steel bearings are employed in the '038 device to reduce effects on the torque sensor.

None of the prior art devices provides an estimate of fish weight during the reeling-in operation. Instead, the purpose of these devices is to facilitate the adjustment of the drag system to reduce the incidence of line breakage. Therefore, a fisherman can only guess at the weight of a hooked fish until the fish is actually landed and weighed.

Thus it is an object of the present invention to provide a fishing reel wherein a sensor is provided in communication with a display to measure the tension on the fishing line and display, among other things, the tension on the line, an estimated weight of the fish during the reeling-in operation, the peak force recorded while fighting the fish, and the actual weight of the fish once landed.

SUMMARY OF THE INVENTION

The present invention provides a fishing reel having a load sensing device for measuring the tension, or outward force, on the fishing line and a display device for indicating information gathered from the load sensing device to the fisherman.

In a preferred embodiment, the sensor is in communication with a microprocessor or a microcontroller which will use information gathered while the fish is being reeled-in to provide an estimate of the fish's weight during the operation. The microprocessor is in further communication with an LCD display for displaying information to the fisherman. Once the fish is landed, the true weight of the fish will be displayed while the fish is suspended from the rod prior to de-hooking.

In another preferred embodiment, current and peak forces exerted on the fishing line are also displayed to the fisherman. This information is useful in adjusting the drag mechanism to avoid unnecessary line breakage.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENT

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 2:
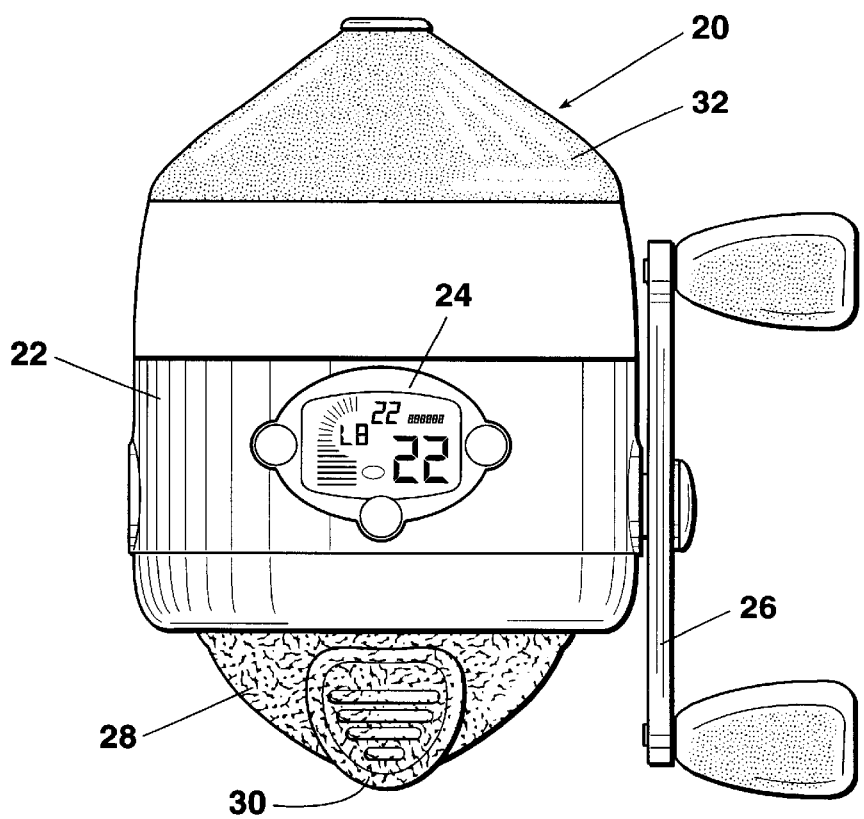
FIG. 2 provides a top view of the preferred embodiment of the inventive fishing reel.
Figure 1:
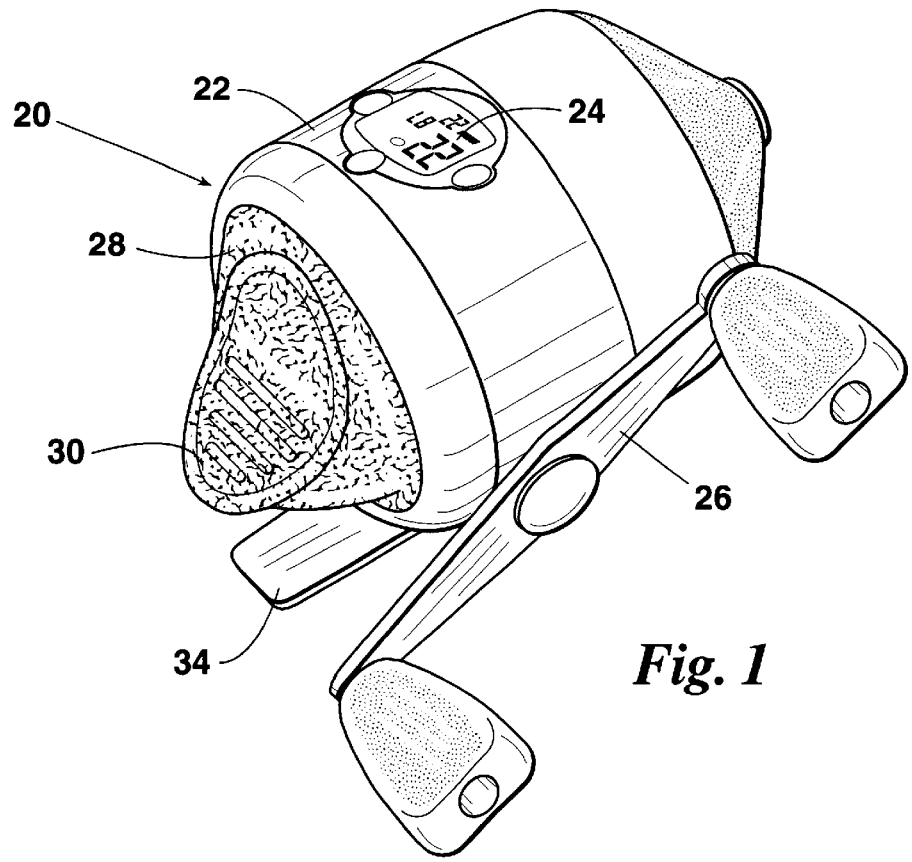
FIG. 1 provides a perspective view of a preferred embodiment of the inventive fishing reel.

Referring now to the drawings, wherein like reference numerals indicate the same parts throughout the several views, a preferred embodiment of the inventive fishing reel 20 with a mechanism to measure line tension and determine the weight of a fish is shown in FIGS. 1 and 2. Fishing reel 20 comprises: a frame 22; display 24 located on the top of frame 22; crank handle 26 for rewinding the fishing line; rear cover 28 secured over the rearward face of frame 22; front cover 32 secured over the forward face of frame 22; and foot structure 34 extending from frame 22 for mounting reel 20 on a fishing rod.

It should be noted that the preferred embodiment of the inventive apparatus is shown and discussed as incorporated in an otherwise ordinary, spin cast reel. Such reels are well known in the art and reference may be had to, for example, U.S. Pat. No. 5,931,399 for a fuller description thereof, said patent being incorporated herein by reference.

Figure 3:
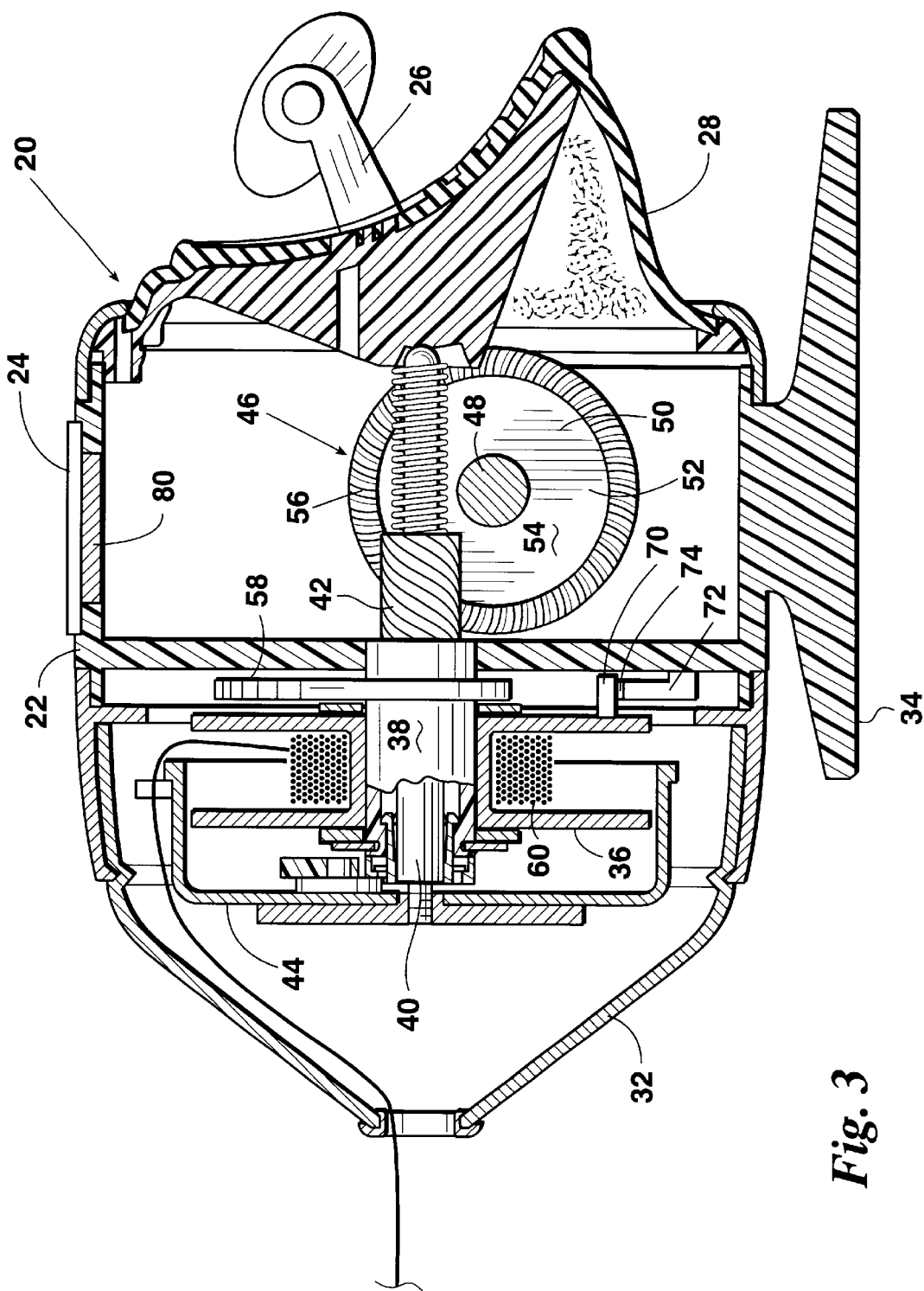
FIG. 3 provides a cutaway side view the inventive fishing reel.

As best seen in FIG. 3, reel 20 further includes: a line spool 36 mounted on a spool hub 38 projecting from the forward face of frame 22; a main operating shaft 40 slidably and rotatably extending through frame 22 and through hub 38; a helical gear 42, mounted on main shaft 40 for rotating shaft 40; a spinner head 44, secured to the forward end of main shaft 40, for winding a fishing line around spool 36; and a drive assembly 46 for engaging and rotating helical gear 42.

Drive assembly 46 comprises: a crankshaft 48 extending laterally into reel 20; crank handle 26 secured on the exterior end of crankshaft 48; and a drive gear 50 mounted on the interior portion of crankshaft 48. Drive gear 50 is preferably a face gear including: a circular body 52 having a forward face 54; and a plurality of gear teeth 56 formed in a circular pattern on the outer periphery of forward face 54.

To rewind the fishing line 60, the fisherman turns the crank handle 26 which in turn rotates drive gear 50 to cause rotation of helical gear 42 and, thus, main shaft 40. Spinner head 44 rotates with main shaft 40 to wind the fishing line 60 onto spool 36. Preferably, reel 20 includes an anti-reverse mechanism (i.e, a one-way clutch or rachet mechanism, not shown) to prevent reverse rotation of crank handle 26 and main shaft 40. Such anti-reverse mechanisms are well known in the art.

In addition, preferably reel 20 will include an adjustable drag mechanism 58. Drag mechanism 58 will allow spinner head 44 to rotate in the reverse direction if an outward force is applied to the fishing line 60 which exceeds the selected drag force. Line tension which does not exceed the selected drag force will not result in any reverse rotation of spinner head 44. Thus, if the drag system is properly adjusted, the drag system will prevent line breakage by limiting the maximum attainable line tension to a level less than the tensile strength of the fishing line. Such drag mechanisms are well known in the art.

Figure 4:
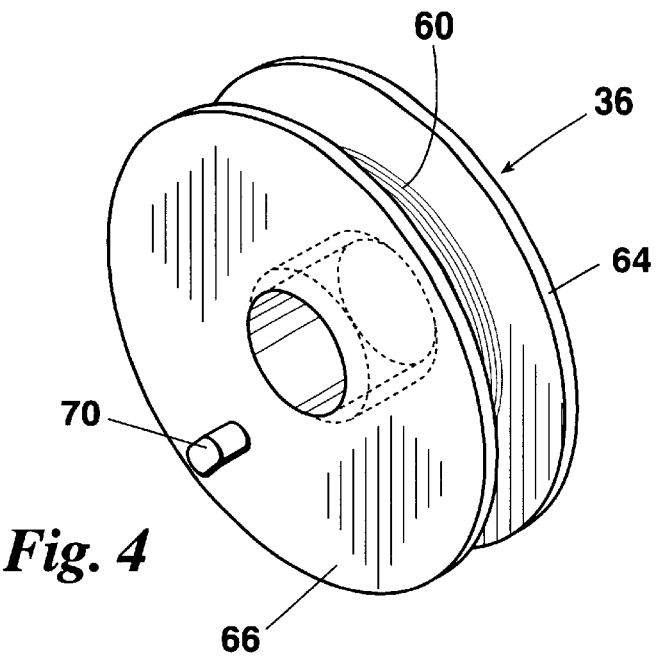
FIG. 4 provides a perspective view of the back side of a line spool as employed in the inventive fishing reel.
Figure 5:
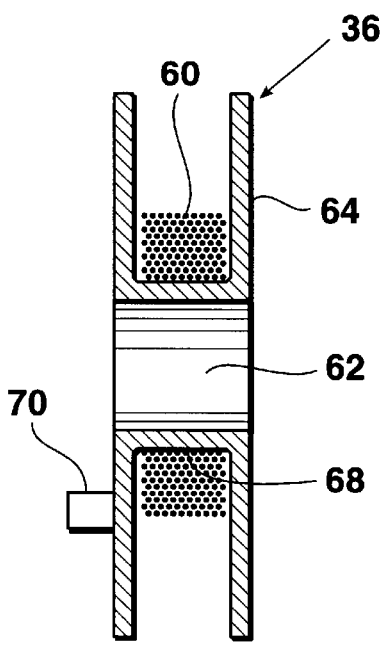
FIG. 5 provides a cutaway side view of the line spool.
Figure 6:
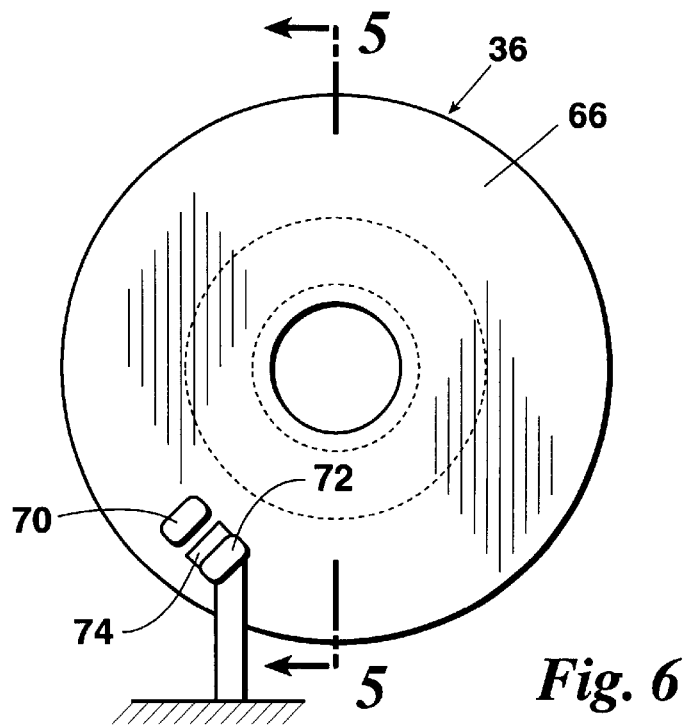
FIG. 6 provides a back view of the line spool showing the interaction between the boss and a load cell for measuring the outward force acting on the fishing line.

Referring next to FIGS. 4–6, spool 36 includes: a central passageway 62 extending through spool 36 for passage of the spool hub 38; a front face 64; a rear face 66; and a spool portion 68 between front face 64 and rear face 66 onto which the fishing line 60 is wound. Boss 70 extends rearward from rear face 66. As best seen in FIG. 3, boss 70 strikes stop 72 formed on frame 22 to prevent rotation of spool 36. Referring again to FIG. 6, a load cell 74 is secured to the contacting surface of stop 72 such that load cell 74 will be sandwiched between stop 72 and boss 70 when stop 72 and boss 70 work in conjunction to prevent rotation of spool.

It should be noted that, in a spin cast fishing reel, the spool normally does not rotate, although in some reels, the spool may rotate as part of the drag system. Instead, winding and unwinding are controlled by the spinner head. When an outward force is applied to line 60, reverse rotation of spinner head 44 is prevented by the anti-reverse mechanism to further prevent unwinding of the line 60. Thus, such outward force will apply torque to spool 36, thereby urging rotation of spool 36. Such rotation, however, is prevented by the interaction of boss 70 and stop 72. The force applied by boss 70 on stop 72 will be proportional to the tension on the fishing line 60, thus allowing measurement of such tension with load cell 74. As will be apparent to those skilled in the art, load cell 74 could be any type of force measuring device such as a strain gauge load cell, a piezo load cell, or the like.

As will also be apparent to those skilled in the art, the torque measured by load cell 74 will be dependent on the distance from the center of spool 36 to the outside of the windings of line 60 on spool 36 (best seen in FIG. 5). To determine the outward pull on line 60 either a means must be employed to measure the height of the windings or, more preferably, it must be assumed that such windings are at a particular height. The accuracy of the force measured may be improved somewhat by adjusting the assumed height of the windings as the line is reeled in.

Figure 7:
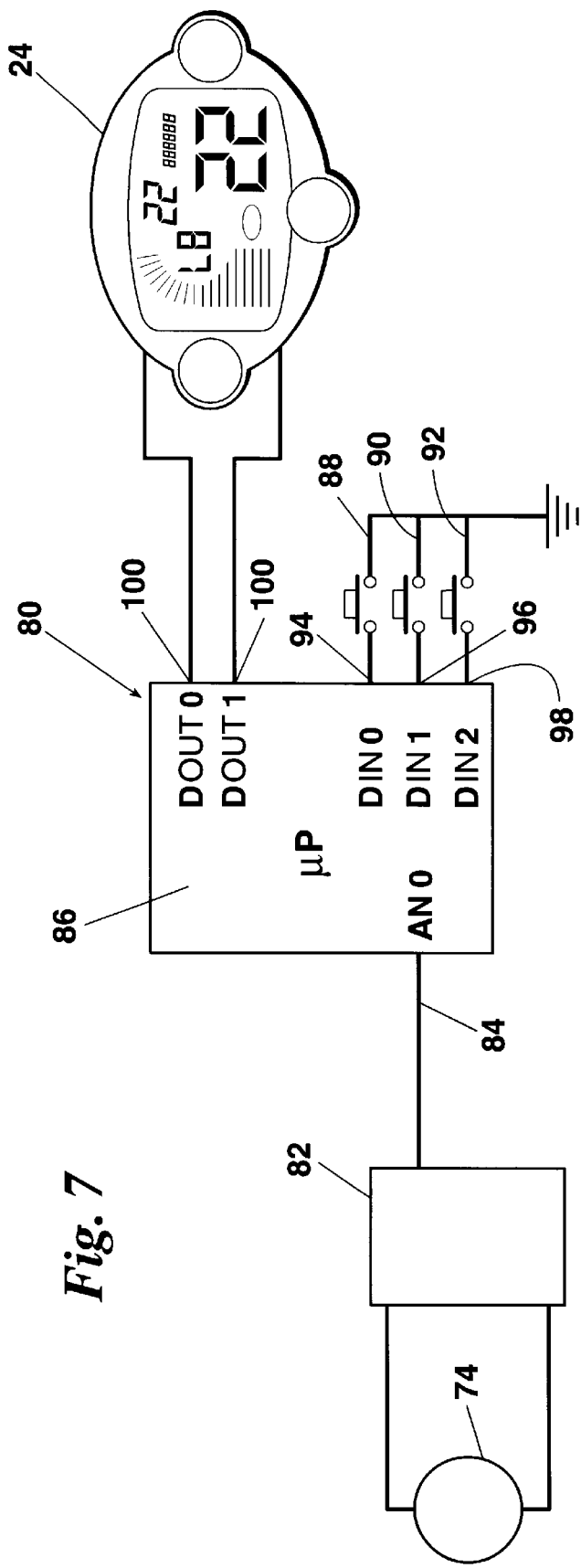
FIG. 7 provides a block diagram of a preferred circuit for use with the inventive device.

FIG. 7 shows a block diagram of a circuit board 80 employed in the inventive reel 20. Preferably, circuit board 80 is located just below the interior side of display 24 (FIG. 3). The output of load cell 74 is connected to signal conditioner 82. Signal conditioning typically consists of an appropriate degree of amplification and some measure of filtering. Signal conditioning circuitry is well known in the art. The output of signal conditioner 82 is connected to analog input 84 of microprocessor 86. Momentary pushbuttons 88, 90, and 92 are connected to digital inputs 94, 96, and 98, respectively, of microprocessor 86 for selecting the display of various parameters and selecting a particular unit of measure for the display (e.g. kilogram meters versus pounds). Digital outputs 100 are provided for activating the various elements of display 24. Display 24 is typically a liquid crystal display; however, a number of suitable display types are available such as LED displays, vacuum flourescent displays, etc.

It should be noted that buttons 88, 90, and 92 may take on different functions depending on the state of the software program. Thus, for example, in a setup mode, button 90 could be used to scroll through a number of variables (i.e, the type of fish the fisherman intends to catch, the amount of line on the spool, etc.). While button 92 could be used to scroll through a selection of values for any given variable. In an operational mode, button 90 could be used to reset the peak display while button 92 is used to select the desired measurements to display.

Figure 8:
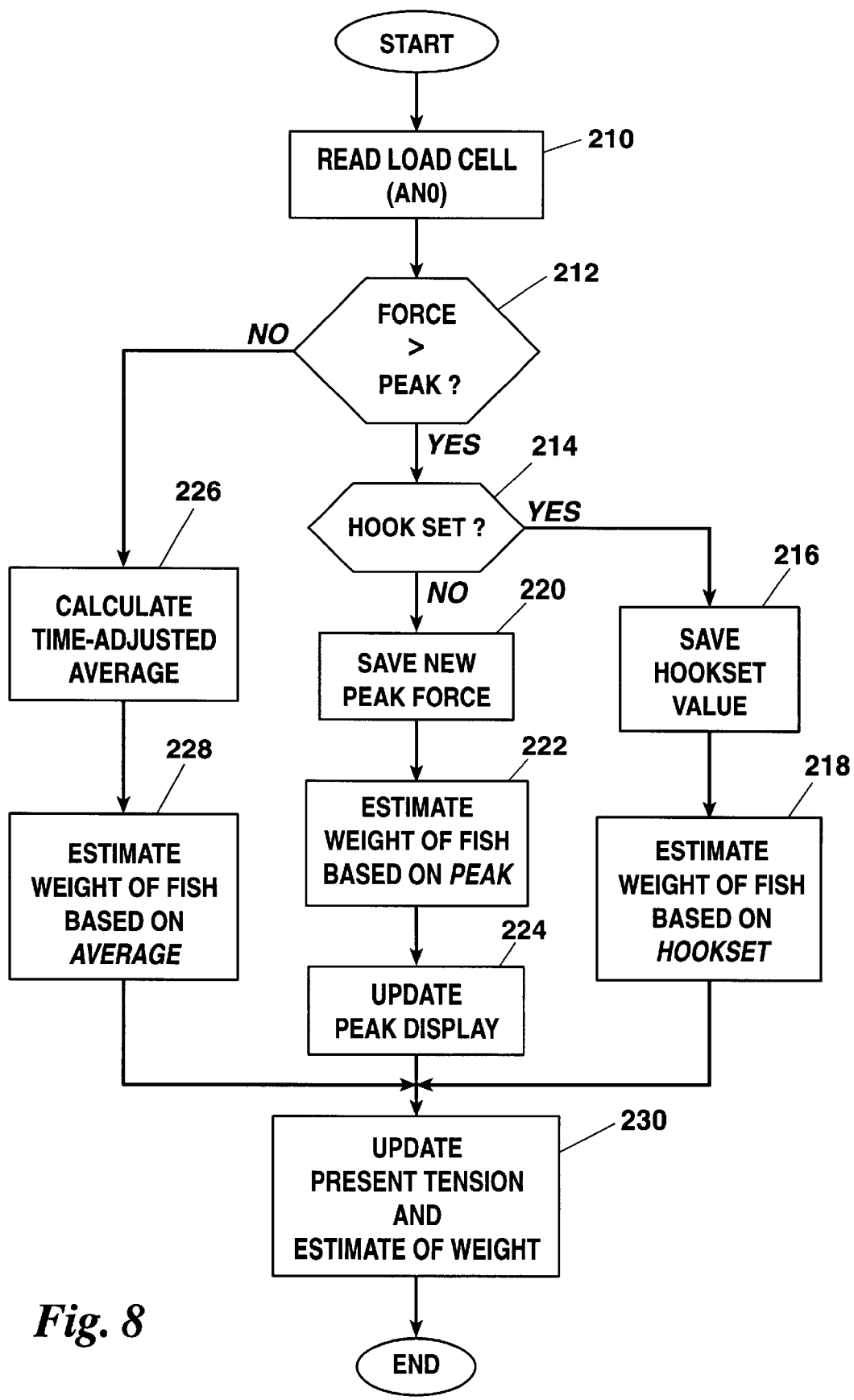
FIG. 8 provides a flow chart for a computer software program for use with the circuit of FIG. 7.

In operation, the microprocessor 86 periodically reads the output of the load cell 74 and performs a series of steps to estimate the weight of the fish on the fishing line. A flow diagram of such a program is depicted in FIG. 8. Periodically, the program begins at step 210 by reading the output of the load cell which is representative of the outward force applied to the line. The force read at step 210 may optionally be adjusted to reflect the height of the windings on spool 36 to somewhat improve the accuracy of the displayed results. At step 212, the present force is compared to the existing peak force on the line. The peak force may be reset prior to catching a fish (e.g., immediately after casting) by pressing button 90 (FIG. 7). If the force is greater than the peak at step 212, and if the peak is the first peak exceeding a predetermined threshold at step 214, the peak is saved as the hook-set force at step 216 and an estimated fish weight is determined at step 218. A lookup table is stored in the computer memory made up of a series of weights stored as a function of hook-set forces. The relationship between hook-set force and fish weight is based on empirical data gathered with a fishing reel adapted to measure and store line tension while reeling-in a fish. At step 218, a pointer into the table is calculated from the hook-set force and an estimated weight of the fish is simply drawn from the table or interpolated from adjacent table entries at the time of hook-set.

If, at step 214, the force does not represent the hook-set, the new force is saved at step 220 as the new peak force. At step 222 the weight of the fish is estimated by calculating a pointer into the table based on the peak force and drawing the estimated weight from a lookup table or by interpolating the weight of the fish from adjacent entries in the table. As with the hook-set table, the relationship between peak force and fish weight represented by the table is based on empirical data. Next, at step 224 the peak force is written to the display. Thus, each time a new peak value is found, the display is updated to reflect the new, higher peak.

Returning to step 212, if the force is less than a previously read peak value, an average tension is calculated at step 226. Optionally, the average force may be adjusted slightly upwards as the duration of the fight increases to account for tiring of the fish. Then at step 228 the average line tension is used to calculate a pointer into the table and an estimate of the weight of the fish is read from the table. Thus, the average force is used to locate a table entry representative of fish weight or to interpolate an estimated weight between two adjacent table entries. As before, the information stored in the table is based on empirical data.

Finally, at step 230, the display is updated to reflect the present line tension and to display the estimated weight of the fish. Any one of the three methods could be used to provide the estimated weight or the displayed estimate could be an average of estimates from two or three of the methods, or a weighted average which favors one method but adjusts the estimate somewhat based on either, or both, of the other estimated values.

As will be apparent to those skilled in the art, when the fish is landed, if the fish is momentarily suspended from the rod, the line tension will be equal to the weight of the fish. Thus, the tension displayed in step 230 will represent the actual weight of the fish under this condition.

While, in the preferred embodiment, the estimated weight was determined from table entries, it will also be apparent to those skilled in the art that a mathematical relationship could instead be used to relate a given force (i.e., hook-set force, peak force, or average force) to the weight of the fish. In such an embodiment, fish would be caught using a reel adapted to gather the forces encountered in the act of landing the fish. Hook-set, peak and average forces would then be plotted against fish weight and conventional methods would be used to find an equation which "best fits" the plot. Best fit algorithms are known in the art.

Furthermore, while the preferred embodiment of the inventive device is described hereinabove and depicted in the accompanying figures as incorporated in a spin cast reel, the invention is not so limited. The inventive device is equally suitable for use in bait cast fishing reels and spinning reels, as well as any other type of reel. It should likewise be noted that a number of devices exist in the prior art for measuring the tension on a fishing line and while such devices may have a number of disadvantages when compared to the inventive device, they are, nonetheless, suitable for use with the inventive device for determining the weight of a fish on a fishing line; and thus, the invention is not limited to a particular embodiment or apparatus for measuring tension. For example: the load cell could instead be located at the line roller where the fishing line exits the reel; U.S. Pat. No. 5,639,038 discloses measurement of the line tension through the use of magnetostrictive magnetic thin bands bonded to the spool shaft and a coil opposed to said bands to measure variations in the line tension; U.S. Pat. No. 5,560,560 discloses a method of determining the tension on a fishing line by measuring the load applied to a bearing support for a spool shaft bearing; U.S. Pat. No. 5,479,831 discloses a means for measuring fishing line tension having bearing supports which include strain gauges; and U.S. Pat. No. 4,650,161 discloses a spinning reel having electronic line tension display means which employs a torsion spring to resist movement of the spool and a swinging arm to indicate the amount of flex in the torsion spring. Each of the devices disclosed in these patents would be a suitable line tension measuring means and each of the above mentioned patents is incorporated herein by reference.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A fishing reel having a line spool in communication with a crank handle for rewinding a fishing line onto said spool which displays the weight of a fish on said fishing line comprising:
   a load cell for measuring an outward force on said fishing line, said load cell having an output;
   a processor in communication with said output, wherein said processor calculates an estimate of the weight of a fish on the fishing line; and
   a display in communication with said processor for displaying the value of said estimate of the weight to a fisherman.

2. The fishing reel of claim 1 further wherein said load cell is configured to measure rotational force applied to said spool.

3. The fishing reel of claim 1 wherein predetermined values for said estimate are stored in a table and a particular value is read from said table corresponding to a given force measured by said load cell.

4. An apparatus for displaying the weight of a fish on a fishing line comprising:
   a load cell for measuring an outward force on the fishing line, said load cell having an output;

a processor in communication with said output; and a display in electrical communication with said processor, wherein said processor displays an estimate of the weight of said fish on said display, said estimate calculated from one or more values read from said output as said fish is being reeled-in.

5. The apparatus of claim 4 further comprising a spin cast fishing reel.

6. The apparatus of claim 5 further comprising a line spool for receiving the fishing line, wherein said load cell is configured to measure the rotational force applied to said spool by an outward force applied to the fishing line.

7. A method for estimating the weight of a fish on a fishing line including the steps of:

(a) creating a table of estimated fish weights, wherein each estimated weight stored in said table corresponds to a particular force acting on the fishing line as a fish is reeled-in;

(b) providing a fishing reel configured to measure the outward force applied to the fishing line, said reel further including a processor having memory and a display;

(c) storing said table in said memory;

(d) measuring a force applied to the fishing line as a fish is reeled-in;

(e) calculating an average force comprising the average of said forces measured in step (d);

(f) reading a value for the estimated weight of the fish on the line from said table, a pointer to said value corresponding to said average force;

(g) displaying said value of the estimated weight on said display;

(h) repeating steps (d)–(g) until the fish is landed.

8. The method of claim 7 wherein step (f) is replaced by the steps of:

(f)(i) reading a lower value from said table, a pointer to said lower value corresponding to a force less than said average force;

(f)(ii) reading an upper value from said table, a pointer to said upper value corresponding to a force greater than said average force;

(f)(iii) interpolating a value for the estimated weight of the fish between said lower value and said upper value from the relationship of said average force relative to said force less than said average force and to said force greater than said average force.

9. A method for estimating the weight of a fish on a fishing line including the steps of:

(a) creating a table of estimated fish weights, wherein each estimated weight stored in said table corresponds to a particular peak force applied to the fishing line as a fish is reeled-in;

(b) providing a fishing reel configured to measure the outward force applied to the fishing line, said reel further including a processor having memory and a display;

(c) storing said table in said memory;

(d) measuring the force applied to the fishing line as a fish is reeled-in;

(e) comparing said force to a peak force;

(f) if said force is greater than said peak force, storing said force as said peak force;

(g) reading a value for the estimated weight of the fish on the line from said table, a pointer to said value corresponding to said peak force;

(h) displaying said value of the estimated weight on said display;

(i) repeating steps (d)–(h) until the fish is landed.

10. The method of claim 9 wherein step (f) is replaced by the steps of:

(f)(i) reading a lower value from said table, a pointer to said lower value corresponding to a force less than said peak force;

(f)(ii) reading an upper value from said table, a pointer to said upper value corresponding to a force greater than said peak force;

(f)(iii) interpolating a value for the estimated weight of the fish between said lower value and said upper value from the relationship of said peak force relative to said force less than said peak force and to said force greater than said peak force.

11. A method for estimating the weight of a fish on a fishing line including the steps of:

(a) creating a table of estimated fish weights, wherein each estimated weight stored in said table corresponds to a particular hook-set force measured on the fishing line as a fish is caught;

(b) providing a fishing reel configured to measure the force applied to the fishing line, said reel further including a processor having memory and a display;

(c) storing said table in said memory;

(d) measuring the force applied to the fishing line as a fish is caught;

(e) reading a value for the estimated weight of the fish on the line from said table, a pointer to said value corresponding to the hook-set force;

(f) displaying the value of the estimated weight on said display.

12. The method of claim 11 wherein step (e) is replaced by the steps of:

(e)(i) reading a lower value from said table, a pointer to said lower value corresponding to a force less than said hook-set force;

(e)(ii) reading an upper value from said table, a pointer to said upper value corresponding to a force greater than said hook-set force;

(e)(iii) interpolating a value for the estimated weight of the fish between said lower value and said upper value from the relationship of said hook-set force relative to said force less than said hook-set force and to said force greater than said hook-set force.

* * * * *

UNITED STATES PATENT AND TRADEMARK OFFICE
CERTIFICATE OF CORRECTION

PATENT NO. : 6,591,222 B2
DATED : July 8, 2003
INVENTOR(S) : Roy E. Stiner

It is certified that error appears in the above-identified patent and that said Letters Patent is hereby corrected as shown below:

<u>Title page,</u>
Item [75], Inventor, add -- Randy Atherton, Tulsa, OK (US) --.

Signed and Sealed this

Second Day of December, 2003

JAMES E. ROGAN
*Director of the United States Patent and Trademark Office*